United States Patent
Smith et al.

(10) Patent No.: US 8,444,742 B2
(45) Date of Patent: May 21, 2013

(54) SOLUBLE CALCIUM FERTILIZER FORMULATION

(75) Inventors: Andrew G Smith, Spring Grove, PA (US); Charles H Svec, Hanover, PA (US); Michael D Fiery, Hanover, PA (US)

(73) Assignee: Miller Chemical & Fertilizer Corporation, Hanover, PA (US)

( * ) Notice: Subject to any disclaimer, the term of this patent is extended or adjusted under 35 U.S.C. 154(b) by 0 days.

(21) Appl. No.: 13/278,444

(22) Filed: Oct. 21, 2011

(65) Prior Publication Data

US 2012/0103041 A1    May 3, 2012

Related U.S. Application Data

(60) Provisional application No. 61/407,092, filed on Oct. 27, 2010.

(51) Int. Cl.
*C05D 9/00* (2006.01)
*C05D 9/02* (2006.01)

(52) U.S. Cl.
USPC ............. 71/31; 71/32; 71/33; 71/54; 71/58; 71/63; 71/64.1

(58) Field of Classification Search
USPC .............................. 71/11–63, 64.1
See application file for complete search history.

(56) References Cited

U.S. PATENT DOCUMENTS

| | | | |
|---|---|---|---|
| 6,241,795 B1 | 6/2001 | Svec | |
| 6,312,493 B1 * | 11/2001 | Eltink et al. | 71/28 |
| 6,391,079 B1 | 5/2002 | Takeda et al. | |
| 7,740,680 B2 | 6/2010 | Marks | |
| 2004/0035162 A1 * | 2/2004 | Williams et al. | 71/28 |
| 2007/0264419 A1 | 11/2007 | Tuli | |
| 2008/0194407 A1 | 8/2008 | Ashmead | |
| 2010/0186471 A1 * | 7/2010 | Vriesema et al. | 71/28 |
| 2011/0224080 A1 * | 9/2011 | Lelas et al. | 504/124 |

FOREIGN PATENT DOCUMENTS

| | | |
|---|---|---|
| CA | 2588224 A1 | 11/2007 |
| CN | 1289743 * | 4/2001 |
| EP | 0784040 A1 | 7/1997 |
| WO | WO 00/63138 | 10/2000 |
| WO | WO-01/25158 A1 | 4/2001 |
| WO | WO 2006/134361 | 12/2006 |

OTHER PUBLICATIONS

International Search Report and Written Opinion of PCT/US2011/057198, mailed Feb. 23, 2012.
Miller Chemical & Fertilizer Corporation product label, Nutrient Express Transcuticular Delivery System 18-18-18, Copyright 1996.
Miller Chemical & Fertilizer Corporation product label, Nutrient Express Transcuticular Delivery System 4-41-27, Copyright 1996.
Miller Chemical & Fertilizer Corporation product label, Nutrient Express Transcuticular Delivery System 11-41-8, Copyright 1996.
Miller Chemical & Fertilizer Corporation product label, Sugar Express 4-10-40, Oct. 2004.
Miller Chemical & Fertilizer Corporation product label, Calcium Chelate, copyright 1987.

* cited by examiner

*Primary Examiner* — Wayne Langel
(74) *Attorney, Agent, or Firm* — Howson & Howson LLP

(57) ABSTRACT

A concentrated aqueous fertilizer which is readily water-soluble and a method of applying the solubilized dilute fertilizer to crops to enhance crop production are described. The dry fertilizer contains a contains nitrogen, phosphorus and potassium compounds, as well as a mixture of plant growth stimulators including at least one of each of growth promoters, vitamins, amino acids, carbohydrates/polysaccharides, and adjuvants.

15 Claims, No Drawings

US 8,444,742 B2

SOLUBLE CALCIUM FERTILIZER FORMULATION

CROSS-REFERENCE TO RELATED APPLICATION

This application claims the benefit under 35 USC 119(e) of the priority of U.S. Patent Application No. 61/407,092, filed Oct. 27, 2010.

BACKGROUND OF THE INVENTION

The present invention relates generally to fertilizers for use in stimulating the health and growth of plants.

Sixteen chemical elements are known to be important to a plant's growth and survival. The sixteen chemical elements are divided into two main groups: non-mineral and mineral. The non-mineral nutrients are hydrogen (H), oxygen (O), & carbon (C). The mineral nutrients are divided between macronutrients and micronutrients. Macronutrients can be broken into two more groups: primary and secondary nutrients. The primary nutrients are nitrogen (N), phosphorus (P), and potassium (K). The secondary nutrients are calcium (Ca), magnesium (Mg), and sulfur (S). Micronutrients are those elements essential for plant growth which are needed in only very small (micro) quantities. These elements are sometimes called minor elements or trace elements, but use of the term micronutrient is encouraged by the American Society of Agronomy and the Soil Science Society of America. The micronutrients are boron (B), copper (Cu), iron (Fe), chloride (Cl), manganese (Mn), molybdenum (Mo) and zinc (Zn).

Fertilizers are added to the soil or foliage of crops to supply elements needed for plant nutrition which are lacking from the soil. Typically, nitrogen, phosphorus and potassium are the principal components of such fertilizers. Calcium is often supplied separately in the form of (dolomitic) lime added separately to the soil. Calcium is an essential part of plant cell wall structure, and has roles in uptake of other nutrients, growth, and the ability of the plant to mitigate the effects of heat stress. Calcium is also thought to counteract the effect of alkali salts and organic acids within a plant.

U.S. Pat. No. 6,241,795 describes a dry concentrated fertilizer which is readily water soluble, providing a combination of nitrogen, phosphorus and potassium compounds with secondary nutrients, micronutrients, and a growth enhancing mixture comprising at least one or more growth promoters, vitamins, amino acids, carbohydrates, polysaccharides, and adjuvants. One commercially available fertilizer providing these components is available from Miller Chemical as Nutrient Express®.

WO2006134361 describes an agricultural composition containing a water-soluble salt of calcium and an auxin mimic that is a substituted diphenyl urea or a derivative thereof. This document describes the limited ability of plants to take up calcium and indicates that its auxin mimic assists in plant uptake of the calcium.

There continues to be a need in the art for new agricultural compositions such as fertilizers that supply nutrients to plants in a readily available form.

SUMMARY OF THE INVENTION

The invention provides a fertilizer comprising calcium, boron, proline, hydroxyproline, L-tryptophan, glycolic acid, and an adjuvant, wherein the ratio of calcium to boron is about 10 parts calcium to 1 part boron. When in final form for application the fertilizer contains at least about 2% calcium and at least about 0.2% boron. Typically, the fertilizer will contain from about 2% calcium to about 10% calcium and about 0.2% to about 1% boron.

In one aspect, the invention provides a concentrated liquid fertilizer for dilution and application in liquid form containing, at a minimum, the above-described components. In one embodiment, the adjuvant is present in an amount from about 2% by weight to about 10% by weight of the total formulation. In a further embodiment, the proline and hydroxyproline are present in a ratio of about 1 to 1, by weight. In still a further embodiment, the adjuvant comprises a non-alkylphenol phosphate ester.

In a further aspect, the invention provides a final liquid fertilizer formulation ready for application. The fertilizer formulation comprises at least about 2% calcium, at least about 0.2% boron, said calcium and boron being in a ratio of about 10 parts by weight calcium to 1 part by weight boron, adjuvant, proline, hydroxyproline, about 10 to to about 1000 parts part million (ppm) L-tryptophan, or about 100 to about 750 ppm L-tryptophan, or about 200 to about 500 ppm L-tryptophan, and about 10 to about 1000 ppm glycolic acid, or about 50 to about 750 ppm glycolic acid, or about 100 to about 500 ppm glycolic acid.

In still a further aspect, the invention provides a method of preparing a fertilizer composition, the method comprising blending the phosphorus, potassium, an adjuvant, L-tryptophan, glycolic acid, proline and hydroxyproline, vitamin blend, and amino acid blend, and mixing calcium hypophosphite into the blended composition.

In yet another aspect, the invention provides a method of promoting crop production. The method comprises spraying crops with the final liquid fertilizer mix, which has been prepared by diluting the concentrated fertilizer described above with water. In one embodiment, the concentrated fertilizer is concentrated fertilizer is mixed with water at a ratio of about 1 part fertilizer to about 1600 parts water (e.g., 1 pint to 200 gallons), or about 1 part fertilizer to about 1200 parts water, or about 4 parts fertilizer to about 600 parts water.

Still other aspects and advantages of the invention will be readily apparent from the detailed description of the invention.

DETAILED DESCRIPTION OF THE INVENTION

The present invention provides a fertilizer which contains soluble calcium in a form readily taken up by plants. The fertilizer is designed to provide this effect in the absence of any auxin component to the fertilizer. The composition is generally prepared as a liquid concentrate which facilitates shipping and handling, and then diluted for application in final liquid form.

The fertilizer formulation is designed to provide at least about 2% calcium and at least about 0.2% boron in the formulation. In one embodiment, the ratio of calcium to boron is about 10 parts calcium to about 1 part boron, by weight. However, other suitable ratios may be selected. Suitable sources of calcium include, e.g., water-soluble forms such as calcium hypophosphite (e.g., such as is available commercially in a 15% solution). In one embodiment, calcium hypophosphite is present in the formulation in an amount of about 50% w/w to about 65% w/w, or about 55% to about 60% w/w, or about 58% w/w (for a 15% solution). Other suitable sources are know and include, without limitation, a calcium salt, e.g., calcium EDTA chelate, calcium chloride, calcium nitrate, calcium phosphate, calcium acetate, carbonate, caseinate, citrate, hydride, hydroxide, hypochlorite, iodate, silicate, or silicide, monocalcium phosphate, dicalcium phosphate, tricalcium phosphate, and mixtures thereof. For example, when sodium borate is selected, it may be present in the formulation in an amount of about 0.5% to about 3%, or about 0.75% to about 2.5%, or about 1% w/w of the formulation. Suitable sources of boron include water soluble borate salts, e.g. sodium borate, or boric acid. Still other sources of boron will be known to those of skill in the art.

Suitably, the formulation further contains proline and hydroxyproline. In one embodiment, these components are present in an amount of about 1000 parts per million (ppm) each. However, under certain circumstances it may be desirable to independently vary the amounts of these components, e.g. from about 100 ppm to about 2000 ppm, or about 500 ppm to 1200 ppm. In one embodiment, the concentrated fertilizer contains proline and hydroxyproline independently in an amount of about 0.04 to 0.06% w/w, or about 0.05% w/w, of the total fertilizer. In another embodiment, proline and hydroxyproline are present in a ratio of about 1:1, by weight.

In one embodiment, the formulation further contains L-tryptophan and glycolic acid. L-tryptophan is generally present in the fertilizer in an amount of about 10 to about 1000 ppm, or about 50 to about 200 ppm, or about 300 ppm to about 700 ppm, or about 500 ppm, in a finished liquid fertilizer formulation. In the dry or liquid concentrate, the L-tryptophan is present in an amount of about 0.03 to about 0.07%, by weight, or about 0.05% by weight of the fertilizer. Other suitable amounts may be readily selected. Suitably, the glycolic acid (hydroxyacetic acid) is present in amount of about 10 to about 1000 ppm, or about 50 to about 750 ppm, or about 75 ppm to about 500 ppm, in a finished liquid fertilizer formulation, or about 200 ppm to about 500 pmm, or about 300 ppm. In the dry or liquid concentrate, the glycolic acid is present in an amount of about 0.02 to about 0.06%, by weight, or about 0.04% by weight of the fertilizer, based on a 70% glycolic acid solution (available commercially, e.g., from DuPont™). Other suitable amounts of glycolic acid concentrations may be readily selected.

The fertilizer formulation further contains an adjuvant or surface active agent (surfactant). This adjuvant may be present in an amount of about 2% w/w to about 10% w/w, about 3% w/w to about 8% w/w, or about 5% w/w of the fertilizer. In one embodiment, the formulation of the invention contains a phosphate ester, provided that the phosphate ester is not an alkylphenol ester. For example, a boron phosphate ester or a fatty alcohol phosphate ester may be selected. Typically, the phosphate ester compounds include a phosphate moiety, preferably the orthophosphate moiety ($PO_4^{-3}$) with hydrogen or substituted cations, and an alcohol moiety. Other hygroscopic, non-phytotoxic and water miscible alcohols may also be appropriate for use in the novel fertilizers. Suitable phosphate alcohol esters include ethylene glycol phosphate ($C_2H_4(OH)_2$) esters, propylene glycol ($C_3H_6(OH)_2$) phosphate esters, and glycerol ($C_3H_5(OH)_3$) phosphate esters. Other forms of phosphate esters may also be acceptable such as diethylene glycol phosphate esters, triethylene glycol phosphate esters and others. For example, polyethylene glycol alkylphosphate esters, where the alkyl is a branched or unbranched carbon chain having a minimum of 6 carbons and up to about 20 carbon atoms, may be selected. Also included are salts, and in particular, potassium salts of the esters described herein. Optionally, an additional adjuvant may be included in the fertilizer formulation. Examples of suitable adjuvants is described in WO 00/63138, dated 24 Mar. 2000, which is incorporated by reference herein. When selected the total adjuvant amount in the formulation is generally in the range of up to about 10% w/w; however, higher amounts may be selected.

In one embodiment, the fertilizer contains water soluble calcium (e.g., calcium hypophophite, calcium EDTA chelate), the boron component (e.g., sodium borate), proline, hydroxyproline, L-tryptophan, glycolic acid, and an adjuvant. In addition, the fertilizer contains the macronutrients phosphorus and potassium, and optionally nitrogen. One or more compounds containing any given macronutrient may be present in a fertilizer of the invention. Suitably, the macronutrient is in water-soluble form. Various sources of these soluble macronutrients are known to those of skill in art.

Potassium may be readily obtained from, for example, potassium nitrate, potassium sulfate, potassium chloride, potassium hydroxide, or potassium phosphate, In one embodiment, one of the potassium containing compounds is combined with the other components of the fertilizer in the foam of a blend that further contains one or more carbon skeletons and/or chelating agents. Such chelating agents may include, e.g., fulvic acid, malic acid, citric acid and succinic acid, and combinations thereof. In one embodiment, these components are obtained as an organic acid blend. Suitably, the organic acid blend is a carboxylic acid blend. Such a blend may contain mono-, di- and tri-carboxylic acids. The blend may be an aqueous based carboxylic acid blend in which fulvic acid is present in an amount of about 5% to about 15% w/w, malic acid is present in an amount of about 15% to about 20% w/w, citric acid is present in an amount of about 15% to about 25% w/w, or about 20% w/w, succinic acid is present in an amount of about 0.5% to about 5% w/w, or about 1.5% to about 2% w/w, with the remainder being water. Optionally, the blend may contain one or more of the foregoing components, or a suitable salt thereof. Alternatively, one or more of the components may be absent from the organic acid blend. Additionally, the blend may optionally further contain an additional component, e.g., potassium carbonate. The phosphorus component may be supplied in the form of one or more components combined directly into the fertilizer. Further one or more optional chelating agents and/or compounds providing a carbon skeleton may be supplied to the formulation. Depending upon the sources of potassium and nitrogen selected, the required amount of phosphorus for inclusion in the fertilizer may be provided in the form of a potassium phosphate or an ammonium phosphate. However, where desired, other sources may include phosphorous acids and salts thereof, e.g., phosphate or hypophosphite. Typically, the concentrated fertilizer contains about 10% to 80% by weight, about 20 to about 60% by weight, or about 30 to 50%, by weight, total phosphorus.

Nitrogen may be supplied in the form of a urea or a salt thereof. Alternatively or additionally, another source of nitrogen compounds may be selected, e.g., an ammonium salt. Suitable salts may include, e.g., nitrate, phosphate, sulfate, molybdate, among others. Generally, where present, the fertilizer contains about 3% to about 20%, about 5% to about 8%, or about 7% by weight, of nitrogen compounds. Optionally, in addition to the calcium and boron in the amounts provided, the fertilizer contains other secondary and micronutrients, as well as other growth enhancing components, e.g., one or more vitamins, growth promoters, carbohydrates, and/or amino acids.

In one embodiment, a multi-vitamin mixture is utilized that contains one or more of the following: ascorbic acid or a suitable salt thereof, biotin, d-biotin, pyridoxine-HCl, thiamine hydrochloride, thiamine mononitrate, riboflavin, folic acid, niacinamide, pantothenic acid and inert carriers), which is commercially available from Vitech Enterprises, Inc, Palisades, N.J. 07054 under the name AGRONOMIX™ and from the Vitamin Institute, Box 230, North Hollywood, Calif. 91603 under the mark SUPERthrive™.

In one embodiment, the vitamin mixture contains ascorbic acid in an amount of 0 to about 15% w/w, about 0.001% to about 15% w/w, or about 0.05% to about 10% w/w, or about 0.08% to about 5% w/w; biotin and/or d-biotin in an amount of 0 to about 5% w/w, about 0.001% to about 5% w/w, or about 0.0004 to about 1% w/w, pyridoxine, or a salt thereof (e.g., HCl) in an amount of 0 to about 0.01% w/w, 0.001% to about 5% w/w, about 0.001% to about 0.01% w/w, or about 0.02% to about 0.5% w/w, thiamine hydrochloride and/or thiamine mononitrate in an amount of 0 to about 2% w/w, 0.001% to about 2% w/w, or about 0.001% to about 0.01% w/w, riboflavin in an amount of about 0 to about 5% w/w, or about 0.001% to about 0.005% w/w, folic acid in an amount of 0% to about 5% w/w, about 0.001% to about 5% w/w, or about 0.001% to about 1% w/w, niacine and/or niacinamide in an amount of 0% to about 5% w/w, 0.001% to about 5% w/w/, or about 0.001% to about 0.005% w/w, pantothenic acid and/or pantothenate in an amount of 0% to about 5% w/w, about 0.001% to about 5% w/w, or about 0.001 to about 0.01% w/w.

Typically, the mixture of vitamins itself is about 0.05 to 0.25% w/w, or about 0.1% of the fertilizer prior to dilution or dissolution. Thus, the fertilizer composition contains at least two, and optionally more of the above—described vitamins which when present, are present in an amount of about 0.05% to about 0.08% ascorbic acid; about 0.0004% to about 0.001% biotin/d-biotin; about 0.001% w/w to about 0.001% w/w, pyridoxine or a salt thereof in an amount of about 0.01% to about 0.5% w/w/, 0.01% to about to 0.02% w/w, thiamine hydrochloride and/or thiamine mononitrate in an amount of about 0.001% to about 0.01% w/w, riboflavin in an amount of about 0.001% to about 0.005%, folic acid in an amount of about 0.001 to about 0.01%, niacin and/or niacinamide in an amount of about 0.001% w/w to about 0.005 w/w, pantothenic acid and/or pantothenate in an amount of 0.001% to about 0.01% w/w.

In another embodiment, the fertilizer contains about 0.25% to 0.75 w/w, or about 0.5% w/w, of an amino acid blend comprising one or more of the following: L-arginine, Betaine hydrochloride, choline bitartrate, L-glutamic acid. L-alanine, L-cysteine or a salt or hydrate thereof, L-Lysine hydrochloride; mannitol, L-proline, L-serine, sorbitol, succinic acid, and L-tryptophan, based on the total weight of the fertilizer concentrate. Optionally, one or more of these components may be absent (i.e., 0 in the amino acid blend).

When present in the amino acid blend, the above components are generally found in an amount of about 3% to about 10% w/w, or about 5 to about 6% w/w L-arginine, about 1% to about 6% w/w, or about 2% to about 3% w/w betaine hydrochloride, about 1 to about 5% w/w, or about 2.5 to about 3.5% w/w choline bitartrate, about 0.5 to about 2% w/w, or about 1 to about 1.5% w/w L-glutamic acid, about 1 to about 5%, or about 2 to about 3% L-alanine, about 0.5% to about 5%, or about 1% to about 1.5% L-cysteine or a salt or hydrate thereof, about 1% to about 5%, or about 2 to about 2.5% w/w L-Lysine or a salt thereof (e.g., hydrochloride); about 2% to about 6%, or about 3% to about 4% w/w mannitol, about 0.5% to about 4%, or about 1.5% to about 2% w/w L-proline, about 0.25% to about 3% w/w, or about 0.5% to about 1% w/w L-serine, about 1.5% to about 6% w/w, or about 2.5% to about 3.5% w/w sorbitol, about 0.5% to about 5% w/w, or about 1% to about 2% succinic acid, about 0.25% to about 2.5%, or about 0.5% to about 1% w/w L-tryptophan. Typically, this type of amino acid blend is in dry form and is provided with an anti-caking agent, or a combination thereof, to prevent agglomeration or clumping of the components. Such an anti-caking agent may be present in an amount of about 30% w/w to about 75% w/w, or about 40% w/w to about 60% w/w, or about 50% w/w. In one embodiment, the anti-caking agent is calcium EDTA chelate. This may be present in an amount of about 40 to about 60% w/w, or about 50% w/w of the blend. However, this component may be substituted, or combined with another anti-caking agent to provide a total amount as described herein. For example, the recently published US 2010/0192653 describes anti-caking agents which may be utilized.

Optionally, caffeine, acetaminophen, anthranilic acid, and/or salicylic acid are included in this amino acid blend. When present in the amino acid blend, acetaminophen is generally present in an amount of 0 to 5% w/w, 0.001% to about 5% w/w, or about 2% to about 5% w/w. When present in the amino acid blend, caffeine is generally provided in an amount of 0 to 2.5%, 0.001 to about 2.5%, or about 0.05 to about 2% w/w, or about 0.1% to about 1%, of the fertilizer. Anthranilic acid is generally present in an amount of about 3%, or about 0.25% to about 2% w/w, or about 0.5% to about 1% w/w anthranilic acid, about 0.5% to about 2% w/w, or about 1% to about 1.5% w/w salicylic acid. Alternatively, one or more of these components may be combined into the fertilizer separately.

Suitable amino acid blends are available commercially and typically further contain an anti-caking agent to facilitate dry blending and/or dissolution. Optionally, other components may be included in the fertilizer formulation.

In one embodiment, a fertilizer composition of the invention contains, at a minimum, the following components, and additionally, water in an amount sufficient to provide for blending of these components.

| Components | Approx. Percentage w/w (% w/w) |
| --- | --- |
| Proline | 0.04-0.06 |
| Calcium Hypophosphite 15% | 55-60 |
| L-Tryptophan | 0.03-0.07 |
| Glycolic Acid 70% | 0.02-0.06 |
| Adjuvant | 2-10 |
| Hydroxyproline | 0.04-0.06 |
| Sodium Borate or Boric Acid | 0.5-3 |
| Urea | 5-8 |

In another embodiment, the fertilizer contains the following components:

| Components | Approx. Wt Percentage |
| --- | --- |
| Proline | 0.05% |
| Calcium Hypophosphite 15% | 58% |
| L-Tryptophan | 0.05% |
| Glycolic Acid 70% | 0.04% |
| Adjuvant | 5.4% |
| Hydroxyproline | 0.05% |
| Sodium Borate or Boric Acid | 1% |
| Urea | 7% |
| Water | 25% |

In still another embodiment, the fertilizer contains the following components:

|  | Approx. | Approx. |
|---|---|---|
| AMINO ACID BLEND | 0.1 to 1% | 0.5 |
| Proline |  | 0.05% |
| Calcium Hypophosphite 15% |  | 58% |
| L-Tryptophan |  | 0.05% |
| Glycolic Acid 70% |  | 0.04% |
| Organic Acid Mix | 1 to 6% | 2.9% |
| Adjuvant |  | 5.4% |
| Hydroxyproline |  | 0.05% |
| Sodium Borate or Boric Acid |  | 1% |
| Urea |  | 7% |
| VITAMIN MIX | 0.05-2% | 0.1% |
| Water (650) gal |  | 25% |
| TOTALS |  | 100% |

Still other suitable formulations within the scope of the invention can be readily prepared by one of skill in the art, given the teachings provided herein.

In one desirable embodiment, the dry components, selected from among those described above, go through a grinding unit and a mixer (e.g., 2000 lb batches are prepared) is charged with the dry ingredients. The liquid components, e.g., the adjuvant, are injected or sprayed into the mixer and blended until a substantially homogenous dry mixture is achieved. The calcium hypophosphite component is blended with the other components after the other components have been combined. Generally, a suitably mixed blend is obtained in about 5 to about 15 minutes. However, mixing times may be adjusted as necessary for convenience.

Without wishing to be bound by theory, the inventor has found that the formulation resulting when the calcium hypophosphite component is added following the blending and mixing of the other components results in a product which is stable and contains fewer degradation products.

In one desirable embodiment, the resulting fertilizer composition is a liquid concentrate. However, a granular form of the fertilizer may be provided.

The fertilizer of the invention is particularly well suited to foliar application but is readily adapted for application by other methods, including, irrigation and soil. Typically, prior to application, the liquid concentrate fertilizer of the invention is diluted in water at a ratio of about 1 part fertilizer to about 1 to about 1600 parts water, or about 4 to about 600 parts water, or more. Generally, for foliar application, the fertilizer is administered in an amount ranging from about 3 to about 10 pounds per acre, and most preferably about 5 pounds per acre. Optionally, for promoting plant growth, crop production, the dry or concentrated fertilizer is placed into a multiplicity spray tank and the fertilizer is diluted with water to obtain liquid fertilizer mixture; and spraying crops with the liquid fertilizer mixture.

In one embodiment, the final liquid fertilizer formulation contains at least about 2% calcium, at least about 0.2% boron, said calcium and boron being in a ratio of about 10 parts by weight calcium to 1 part by weight boron, proline, hydroxyproline, about 10 to about 1000 parts part million (ppm) L-tryptophan, and about 10 to about 1000 ppm glycolic acid.

The fertilizer is applied according to crop-specific recommendations which will depend upon the application method, time of application, rate of application, and product formulation. Crops that will benefit from the fertilizer include, but are not limited to, fruit, nuts, citrus, watermelon, tomatoes, peppers, cucumbers, row crops such as cotton, corn and wheat, as well as other edible, commercial and ornamental plants.

In one embodiment, the fertilizer of the invention is applied through the use of a multiplicity spray tank. However, other methods for delivery of the fertilizer will be readily apparent to those of skill in the art.

The following examples are illustrative only and are not a limitation on the present invention.

Example 1

Preparation of Exemplary Fertilizer

One fertilizer composition is prepared by blending the following components in a mixer charged with the ingredients after grinding the dry ingredients. The percentages identified above, are based upon the total weight of the fertilizer mixture. After mixing of the dry components, the calcium hypophosphite components is sprayed directly into the mixer and then blended for about 15 minutes.

|  | Percent |
|---|---|
| Amino Acid Blend | 0.534% |
| Proline | 0.051% |
| Calcium Hypophosphite 15% | 57.754% |
| L-Tryptophan | 0.046% |
| Glycolic Acid 70% | 0.041% |
| Organic Acid Blend | 2.922% |
| Adjuvant | 5.421% |
| Hydroxyproline | 0.051% |
| Sodium Borate | 1.027% |
| Urea | 6.930% |
| Vitamin Mixture | 0.103% |
| Water (650) gal | 25.119% |
| TOTALS | 100.000% |

| Amino Acid Blend | Percent |
|---|---|
| Acetominophen | 2.45% |
| Anthranilic Acid | 0.92% |
| L-Arginine | 5.97% |
| Betaine Hydrochloride | 2.81% |
| Choline Bitartrate | 3.30% |
| L-Glutamic Acid | 1.35% |
| L-Alanine | 2.88% |
| L-Cysteine HCl Monohydrate | 1.31% |
| L-Lysine HCl | 2.13% |
| Mannitol | 3.84% |
| L-Proline | 1.70% |
| Salicylic Acid | 1.21% |
| L-Serine | 0.78% |
| Sorbitol | 3.05% |
| Succinic Acid | 1.81% |
| Calcium EDTA Chelate | 50.74% |
| L-Tryptophan | 0.59% |
| TOTALS | 100.000% |

| Organic Acid Blend | Percent |
|---|---|
| Fulvic Acid Liquid | 10.692% |
| Malic Acid | 18.526% |

-continued

| Organic Acid Blend | Percent |
| --- | --- |
| Citric Acid | 19.453% |
| Succinic Acid | 1.621% |
| Potassium Carbonate | 7.411% |
| Water | 42.297% |
| TOTALS | 100.000% |

All publications cited in this specification are incorporated herein by reference herein. While the invention has been described with reference to a particularly preferred embodiment, it will be appreciated that modifications can be made without departing from the spirit of the invention. Such modifications are intended to fall within the scope of the appended claims.

The invention claimed is:

1. A concentrated fertilizer for dilution and application in liquid form, said fertilizer consisting essentially of
    water,
    a dissolved calcium compound,
    a dissolved boron compound,
    proline, hydroxyproline, L-tryptophan, glycolic acid, and at least one further amino acid, about 3% by weight to about 8% by weight of a nitrogen compound,
    at least one vitamin, and
    at least one adjuvant compound in an amount of about 5% to 10% by weight of the formulation,
    wherein the ratio of calcium to boron is about 10 parts calcium to 1 part boron, whereupon when diluted to final liquid form for application the fertilizer contains at least about 2% calcium and at least about 0.2% boron.

2. The fertilizer according to claim 1, wherein the adjuvant is present in an amount from about 2% by weight to about 10% by weight of the total formulation.

3. The fertilizer according to claim 1, wherein the L-tryptophan is present in an amount of about 0.025% to about 0.075% w/w of the total dry fertilizer.

4. The fertilizer according to claim 3, wherein the L-tryptophan is present in an amount of about 0.05% w/w of the total dry fertilizer.

5. The fertilizer according to claim 1, wherein the glycolic acid is present in an amount of about 0.03 to 0.06% w/w of the total fertilizer.

6. The fertilizer according to claim 5, wherein the glycolic acid is present in an amount of about 0.04% w/w of the total fertilizer.

7. The fertilizer according to claim 1, wherein the hydroxyproline is present in an amount of about 0.04 to 0.06% w/w of the total fertilizer.

8. The fertilizer according to claim 7, wherein the hydroxyproline is present in an amount of about 0.05% w/w of the total fertilizer.

9. The fertilizer according to claim 1, wherein the proline and hydroxyproline are present in a ratio of about 1 to about 1 by weight.

10. The fertilizer according to claim 1, comprising about 3 to 7% of an adjuvant selected from the group consisting of non-alcohol phosphate esters.

11. The fertilizer according to claim 1, wherein the calcium is in the form of calcium hypophosphite, calcium EDTA chelate, or a combination thereof.

12. The fertilizer according to claim 1, wherein the at least one vitamin comprises about 2 to 4% w/w of a vitamin mix comprising ascorbic acid, biotin, d-Biotin, pyridoxine-HCl, thiamine hydrochloride, thiamine mononitrate, riboflavin, folic acid, niacin, niacinamide, pantothenic acid, pyridoxine hydrochloride and inert carriers.

13. The fertilizer according to claim 1, wherein the at least one further amino acid comprises about 0.25 to 0.75% w/w of an amino acid blend comprising: acetaminophen, caffeine, anthranilic acid, L-arginine, Betaine hydrochloride, choline bitartrate, L-glutamic acid, L-alanine, L-cycstein or a salt or hydrate thereof, L-Lysine hydrochloride; mannitol, L-proline, salicylic acid, L-serine, sorbitol, succinic acid, calcium EDTA chelate, L-tryptophan, based on the total weight of the fertilizer concentrate.

14. The fertilizer according to claim 13, wherein the amino acid blend further comprises an inert anti-caking agent.

15. A final liquid fertilizer formulation ready for application, said fertilizer formulation consisting of an aqueous solution consisting of water, inert components, at least about 2% calcium, at least about 0.2% boron, said calcium and boron being in a ratio of about 10 parts by weight calcium to 1 part by weight boron, proline, hydroxyproline, about 10 to about 1000 parts part million (ppm) L-tryptophan, and about 10 to about 1000 ppm glycolic acid.

* * * * *